US008923298B2

(12) United States Patent
Wang et al.

(10) Patent No.: US 8,923,298 B2
(45) Date of Patent: Dec. 30, 2014

(54) OPTIMIZED TRIE-BASED ADDRESS LOOKUP

(75) Inventors: Zixiong Wang, Ottawa (CA); Yuanming Zheng, Beijing (CN); Xiaozhong Wang, Beijing (CN); Wenyong Zhang, Beijing (CN)

(73) Assignee: Futurewei Technoligies, Inc., Plano, TX (US)

( * ) Notice: Subject to any disclaimer, the term of this patent is extended or adjusted under 35 U.S.C. 154(b) by 104 days.

(21) Appl. No.: 13/464,840

(22) Filed: May 4, 2012

(65) Prior Publication Data
US 2013/0294450 A1 Nov. 7, 2013

(51) Int. Cl.
H04L 12/28 (2006.01)

(52) U.S. Cl.
USPC ..................... 370/392; 370/395.32

(58) Field of Classification Search
CPC ..... H04L 45/00; H04L 45/7457; H04L 45/54; H04L 45/748; G06F 17/30327; G06F 17/30333
USPC ............ 370/229, 235, 255, 389, 392, 395.32, 370/395.42, 409, 428, 429
See application file for complete search history.

(56) References Cited

U.S. PATENT DOCUMENTS

| | | | | |
|---|---|---|---|---|
| 6,018,524 A * | 1/2000 | Turner et al. | | 370/392 |
| 6,345,126 B1 * | 2/2002 | Vishwanath et al. | | 382/253 |
| 6,658,482 B1 * | 12/2003 | Chen et al. | | 709/245 |
| 6,697,363 B1 * | 2/2004 | Carr | | 370/389 |
| 6,970,971 B1 * | 11/2005 | Warkhede et al. | | 711/108 |
| 7,007,101 B1 * | 2/2006 | Schwaderer | | 709/238 |
| 7,627,691 B1 * | 12/2009 | Buchsbaum et al. | | 709/242 |
| 8,270,401 B1 * | 9/2012 | Barnes et al. | | 370/389 |
| 8,401,015 B2 * | 3/2013 | Sundstrom | | 370/392 |
| 2004/0111439 A1 * | 6/2004 | Richardson et al. | | 707/200 |
| 2004/0193632 A1 * | 9/2004 | McCool et al. | | 707/101 |
| 2007/0091899 A1 * | 4/2007 | Ward et al. | | 370/395.32 |
| 2009/0150603 A1 * | 6/2009 | Sahni et al. | | 711/108 |
| 2012/0110025 A1 * | 5/2012 | Reznik | | 707/797 |
| 2013/0034096 A1 * | 2/2013 | Hu et al. | | 370/389 |
| 2013/0226885 A1 * | 8/2013 | Ottaviano | | 707/693 |
| 2014/0181235 A1 * | 6/2014 | Sindhu et al. | | 709/213 |
| 2014/0204644 A1 * | 7/2014 | Maurya et al. | | 365/49.17 |

* cited by examiner

*Primary Examiner* — Paul H Masur
*Assistant Examiner* — Michael Phillips

(57) ABSTRACT

One embodiment of the present invention provides a router. The router includes a storage, a forwarding table management mechanism, and a longest prefix matching mechanism. The storage stores, in a data structure corresponding to a rich prefix node associated with a trie, a plurality of network address prefixes represented by the trie. The forwarding table management mechanism expresses a respective network address prefix using one or more of: 1) a traversal path on the trie from a root node to a subtree of the trie; and 2) an encoded representation of a node in the subtree. The longest prefix matching mechanism matches a network address with a longest prefix from the network address prefixes stored in the data structure corresponding to the prefix node.

24 Claims, 12 Drawing Sheets

OPTIMIZED TRIE-BASED ADDRESS LOOKUP

BACKGROUND

1. Field

The present disclosure relates to network route lookup. More specifically, the present disclosure relates to a method and system for efficiently representing and accessing sparsely distributed network address prefixes.

2. Related Art

The relentless growth of the Internet has brought with it an insatiable demand for bandwidth. As a result, equipment vendors race to build larger, faster, and more versatile routers to move traffic, especially in the core networks. However, such a router is typically coupled to a large number of other routers through a plurality of network interfaces and can forward traffic to a large number of sub-networks. Consequently, the router needs to maintain forwarding information, such as network address prefixes, for all sub-networks and interfaces in a database, known as a Forwarding Information Base (FIB).

Upon receiving a packet, the router performs a network address lookup. The lookup process finds the longest match between the destination address of the packet and a network address prefix and determines the corresponding outgoing interface. Hence, storing and accessing such information efficiently and intelligently can improve the lookup process, and thereby one of the most challenging problems in today's networking paradigm.

Trie lookup is one of the most popular network address lookup techniques used in a router. A trie is a tree data structure, wherein the position of a node in the tree represents a corresponding key. Particularly for representing network address prefixes in an FIB, a node in a trie represents a longest prefix match up to the position of the node. The lookup technique using a trie can be further improved with a multi-bit trie that examines multiple bits from a network address for a lookup. Such a multi-bit trie-based lookup works particularly well for densely populated tries. However, with the increasing popularity of Virtual Private Network (VPN) and Internet Protocol (IP) version 6 (IPv6), prefixes in an FIB have become sparsely populated. Consequently, the traditional multi-bit trie-based lookup techniques have become ill-equipped to efficiently store and access these sparsely populated tries.

SUMMARY

One embodiment of the present invention provides a router. The router includes a storage, a forwarding table management mechanism, and a longest prefix matching mechanism. The storage stores, in a data structure corresponding to a rich prefix node associated with a trie, a plurality of network address prefixes represented by the trie. The forwarding table management mechanism expresses a respective network address prefix using one or more of: 1) a traversal path on the trie from a root node to a subtrie of the trie; and 2) an encoded representation of a node in the subtrie. The longest prefix matching mechanism matches a network address with a longest prefix from the network address prefixes stored in the data structure corresponding to the prefix node.

In a variation on this embodiment, the encoded representation is based on offset encoding indicating the location of the node in the subtrie.

In a variation on this embodiment, the traversal path to the subtrie corresponds to encoded representations of a plurality of nodes in the subtrie.

In a variation on this embodiment, the rich prefix node is associated with a plurality of subtries of the trie.

In a variation on this embodiment, the forwarding table management mechanism also distributes the network address prefixes to a plurality of prefix nodes based on one or more pivot values, wherein a respective pivot value identifies a range of network address prefixes to be associated with a corresponding rich prefix node.

In a further variation on this embodiment, the forwarding table management mechanism distributes a respective network address prefix to a corresponding rich prefix node after determining the network address prefix to be greater than or smaller than the pivot value. In response to the network address prefix being greater than the pivot value, the forwarding table management mechanism associates the network address prefix to a first rich prefix node; and in response to the network address prefix being smaller than the pivot value, the forwarding table management mechanism associates the network address prefix to a second rich prefix node.

In a further variation on this embodiment, the longest prefix matching mechanism also identifies a respective prefix node for the network address using the pivot values.

In a variation on this embodiment, a plurality of rich prefix nodes are associated with a trie node, wherein the trie node represents one or more network address prefixes.

In a variation on this embodiment, the storage also stores a pointer to an array associated with the prefix node, wherein a respective element in the array corresponds to a respective network address prefix in the prefix node and contains forwarding information associated with the network address prefix.

In a further variation on this embodiment, elements in the array are ordered in the same way as the network address prefixes are ordered in the prefix node.

One embodiment of the present invention provides a router. The router includes a storage, a forwarding table management mechanism, and a longest prefix matching mechanism. The storage stores, in a data structure corresponding to a prefix node associated with a trie, a plurality of network address prefixes represented by a subtrie of the trie. The forwarding table management mechanism expresses the network address prefixes using: 1) a chunk vector indicating the presence of a network address prefix in a chunk of the subtrie, wherein the chunk represents a sub-tree of the subtrie; and 2) an encoded representation of a node in the chunk. The longest prefix matching mechanism matches a network address with a longest prefix from the network address prefixes stored in the data structure corresponding to the prefix node.

In a variation on this embodiment, the encoded representation is based on a bit indicating whether the node is in the same chunk as a preceding node and an offset encoding indicating the location of the node in the chunk.

In a variation on this embodiment, the storage also stores a pointer to an array associated with the prefix node, wherein a respective element in the array corresponds to a respective network address prefix in the prefix node and contains forwarding information associated with the network address prefix.

DETAILED DESCRIPTION

Figure 1:
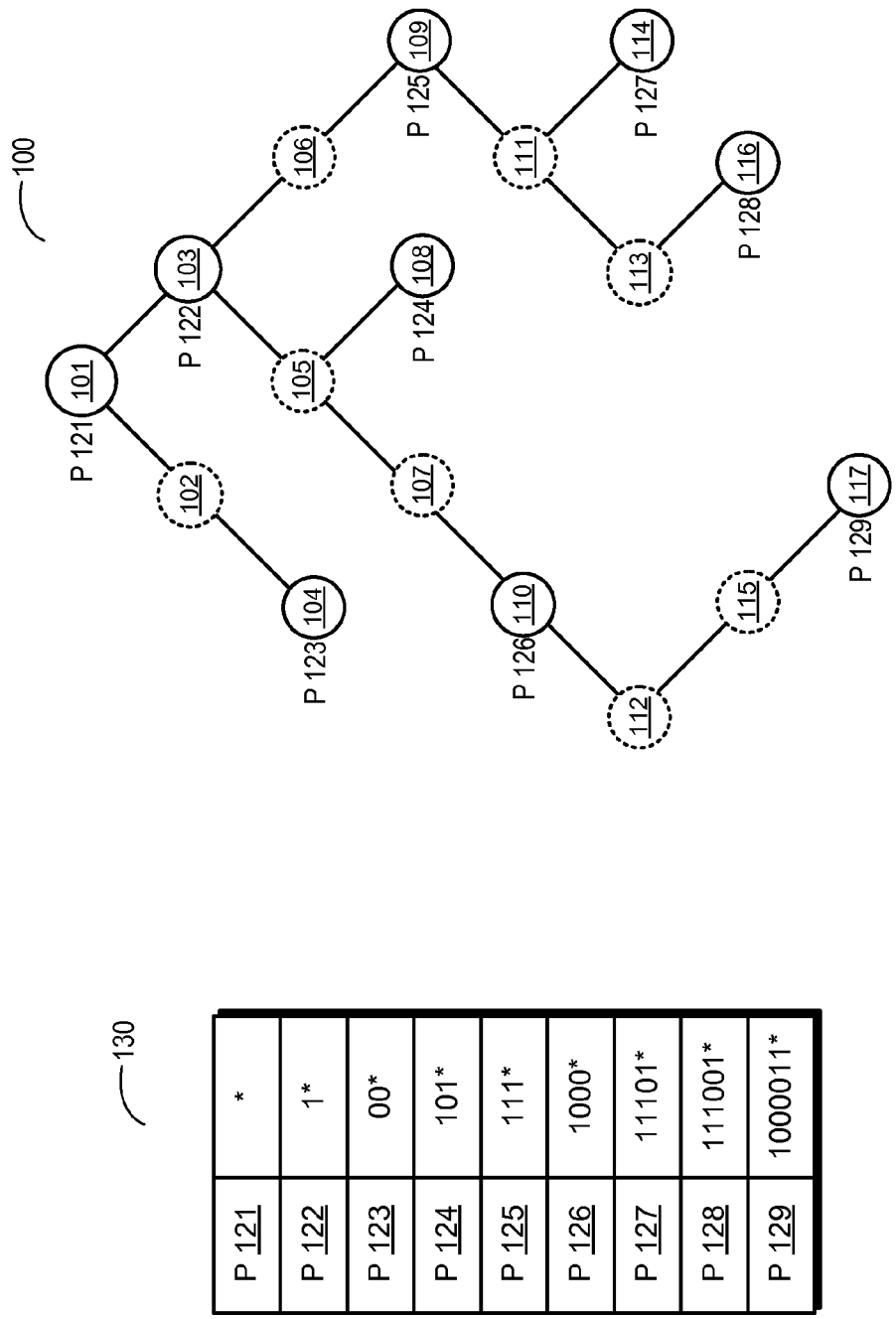
FIG. 1 illustrates an exemplary trie corresponding to a set of network address prefixes.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of improving storage and processing efficiency of network address prefix lookup is solved by storing the prefixes in a compact and easily accessible data structure corresponding to a prefix node associated with a trie. A trie, or a prefix tree, represents an FIB, and a node in the trie corresponds to a partial or full network address prefix. To improve the performance of a trie, multiple bits from a network address can be examined and compared with the trie. The number of bits examined at a time is known as a stride size. The trie can be subdivided into subtries based on the stride size, wherein a respective subtrie represents a segment of network address prefixes with stride-size bits. A respective prefix in a trie is represented by two components: a subtrie to which the prefix belongs and a location within that subtrie that corresponds to the prefix. A respective subtrie is typically represented by a subtrie node, a prefix node containing the network address prefixes associated with the subtrie, and a pointer to an array containing forwarding information corresponding to the prefixes. The array is known as a routing element array.

If a stride size is 8, a subtrie can have up to 511 nodes. A node in the subtrie can be represented by a bit in a bit vector. While this vector representation is efficient for a dense subtrie, it is inefficient for a sparse subtrie. To improve the storage efficiency for a sparse subtrie, the prefixes can be encoded using offset encoding, where the position of a node in a subtrie is represented by an offset value. A respective node on the subtrie can be numbered in breadth-first order, and the resulting number can be used to identify the node in the subtrie. For example, an offset-encoded value of n indicates the nth node in the subtrie in a breadth-first order. With offset encoding, a respective node can be represented by 8 bits. Besides the position of the prefix in the trie, the prefix node also contains a pointer that points to an array containing forwarding information associated with the prefix. The pointer increases the memory requirement for a subtrie. For example, for an FIB with 16 million entries, such a pointer can be 24 bits long. Furthermore, a respective subtrie is represented by a respective subtrie node, leading to additional memory requirements.

When network address prefixes are sparsely distributed, such representations of prefixes using multi-bit subtries can lead to inefficient storage and slower memory access. For example, if a prefix node of a trie node contains only one prefix, for a typical implementation with fixed prefix node size of 128 bits, this is highly inefficient. One solution is to use variable-sized prefix nodes, and represent this prefix node prefix as an 8-bit offset plus 24 bit pointer, for a total of 32 bits. However, such irregular prefix node sizes leads to heavy memory fragmentation. Consequently, accessing the prefixes from such a fragmented memory occupancy can make the lookup process slow and inefficient.

To efficiently store and access memory address prefixes, embodiments of the present invention facilitate a forwarding table management mechanism that stores a plurality of network address prefixes in a data structure that represents a logical node, referred to as a "rich prefix node," and represents a subtrie and its selected child subtries using a single subtrie node. Instead of putting sparsely distributed prefixes in separate prefix nodes, these prefixes can be stored in a rich prefix node pointed to by a trie node. As a result, the need to have both a subtrie node and a prefix node for a respective child subtrie is removed. The rich prefix node contains one pointer pointing to the array containing forwarding information. One trie node, one rich prefix node, and one pointer are used to fully represent the original set of subtries, thus achieving much higher memory efficiency compared to traditional multi-bit trie-based techniques.

For a respective prefix, the rich prefix node contains a reference to the subtrie to which the prefix belongs and a representation of a location within that subtrie that corresponds to the prefix. By incorporating both components that represent a prefix in a trie, a single rich prefix node can include prefixes belonging to different subtries. For a respective prefix, the prefix node includes a tree-traversal path from the root node of the top subtrie to the subtrie to which the prefix belongs. By tracing through the path, the prefix can be associated with the corresponding subtrie. The position of a node represents a prefix using offset encoding in the subtrie. Combining the traversal path with the offset encoding allows the rich prefix node to contain prefixes from different subtries.

The rich prefix node uses equal-length fields to represent both tree-traversal paths and offset encodings. The most significant bit (MSB) of a respective field is used as a flag that distinguishes the path with encoding. When representing a path, one field represents traversal through one subtrie. Such consecutive fields indicate consecutive traversal through multiple subtries. For example, if a subtrie can be reached after traversals though two subtries, two consecutive fields in the rich prefix node are used to represent the traversal path. After the subtrie is identified, the next adjacent field is used to incorporate the offset encoding, thereby identifying the prefix. Because a respective prefix can be accessed via one subtrie and one rich prefix node, the memory access is more efficient. Furthermore, equal-length fields allow efficient reading of data from the rich prefix node.

The terms "prefix tree" and "trie" refer to an ordered tree data structure, wherein the position of a node in the tree represents a corresponding key. Typically, the key includes a binary tree traversal to the node from the root node of the trie. Tries shown in the drawings accompanying this disclosure are binary trees representing network addresses constructed with 0's and 1's. A trie can be any other form of a prefix tree and should not be interpreted as limiting embodiments of the present invention to binary trees.

In this disclosure, the term "sub-tree" refers to a first tree data structure constructed with vertices and edges present in a second tree data structure. The term "subtrie" refers to a first trie data structure which is a sub-tree of a second trie. The term "root node" refers to a vertex in a tree data structure from which the tree originates. In this disclosure, the terms "vertex" and "node" are used interchangeably.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

The term "network address" refers to an identifier that can identify a device in a network. A "network address" should not be interpreted as limiting embodiments of the present invention to IP network addresses. "Network address" can be replaced by other terminologies referring to an identifier of a device in a network, such as "name" or "identifier."

Although this description includes examples based on IP routers, embodiments of the present invention are not limited to IP routers. Any forwarding device, such as switches, routers, and forwarders, can implement such embodiments. Furthermore, the term "router" is used in a generic sense and should not limit the scope of this disclosure. "Router" can refer to any type of switching system in general.

Lookup Using a Trie

A network router typically has a few network prefixes stored in an FIB. These prefixes are represented by specific nodes on a trie. During operation, a packet arrives at the router with a network address. Then, a lookup process is initiated, wherein a respective bit in the address is examined and a corresponding traversal through the trie is performed. During the traversal, whenever a node corresponding to a prefix in the FIB is found, the lookup process determines that the address matches the prefix. This process continues until the longest prefix that is stored in the FIB corresponding to the address is found. This match is known as the longest prefix match. Subsequent forwarding operations on the packet are performed based on this match.

FIG. 1 illustrates an exemplary trie corresponding to a set of network address prefixes. Using such a trie is typical for lookup. In this example, 8-bit-long network addresses are considered to demonstrate how network prefixes are represented by a trie. Any combination of 8-bit-long 1's and 0's can be a network address. Though the example is shown using 8-bit-long addresses, the same concept can be applied to longer network addresses, such as 32-bit-long IP version 4 (IPv4) and 128-bit-long IPv6 addresses. Prefix table 130 contains a list of prefixes stored in an FIB. Trie 100 includes nodes 101-117 and represents network prefixes shown in prefix table 130. Nodes 101-117 are numbered based on a breadth-first order. Prefix table 130 includes prefixes 121-129. In trie 100, a left child node indicates a 0 and a right child node indicates a 1. For example, left child node 102 from root node 101 corresponds to a 0, and right child node 103 from root node 101 corresponds to a 1. All other nodes in trie 100 follow the same pattern. For example, traversing to node 108 from root node 101 requires one right, one left, and one right traversal. As a result, node 108 represents a prefix 101.

Prefix 121 in table 130 represents "*" indicating that prefix 121 can be a prefix to any network address. Because root node 101 does not need any traversal in trie 100, node 101 represents prefix 121. Prefix 124 represents "101*" indicating that prefix 124 can be a prefix to any network address beginning with "101." In other words, prefix 124 corresponds to network address prefix "101" and is represented by node 108. Similarly, nodes 103, 104, 109, 110, 114, 116, and 117 in trie 100 represent prefixes 122, 123, 125, 126, 127, 128, and 129, respectively. Note that the asterisk symbol ("*") following a prefix denotes any combination of bits from then on, and is not part of the prefix itself.

Consider node 114 representing network prefix 127 of "11101." Network prefixes 122 of "1" and 125 of "111" are included in prefix 127. Consequently, node 103 representing prefix 122 and node 109 representing prefix 125 are part of the tree traversal-path to node 114. This feature of a trie facilitates finding the longest prefix match. For example, during operation, when trie 100 is traversed for an 8-bit network address "11101011," at first, node 101 provides a match for "*." When the trie is traversed further based on the address, node 103 provides a match for "1," and node 109 provides a match for "111" with the address. Finally, node 127 provides a match for "11101" which is the longest prefix match for the address. Hence, the longest traversal to a prefix in trie 100 can be considered as the longest prefix match. Note that trie 100 is constructed to represent prefixes stored in a network router. Hence, a node in trie 100 may not correspond to a prefix (denoted using dotted circles).

Figure 2:
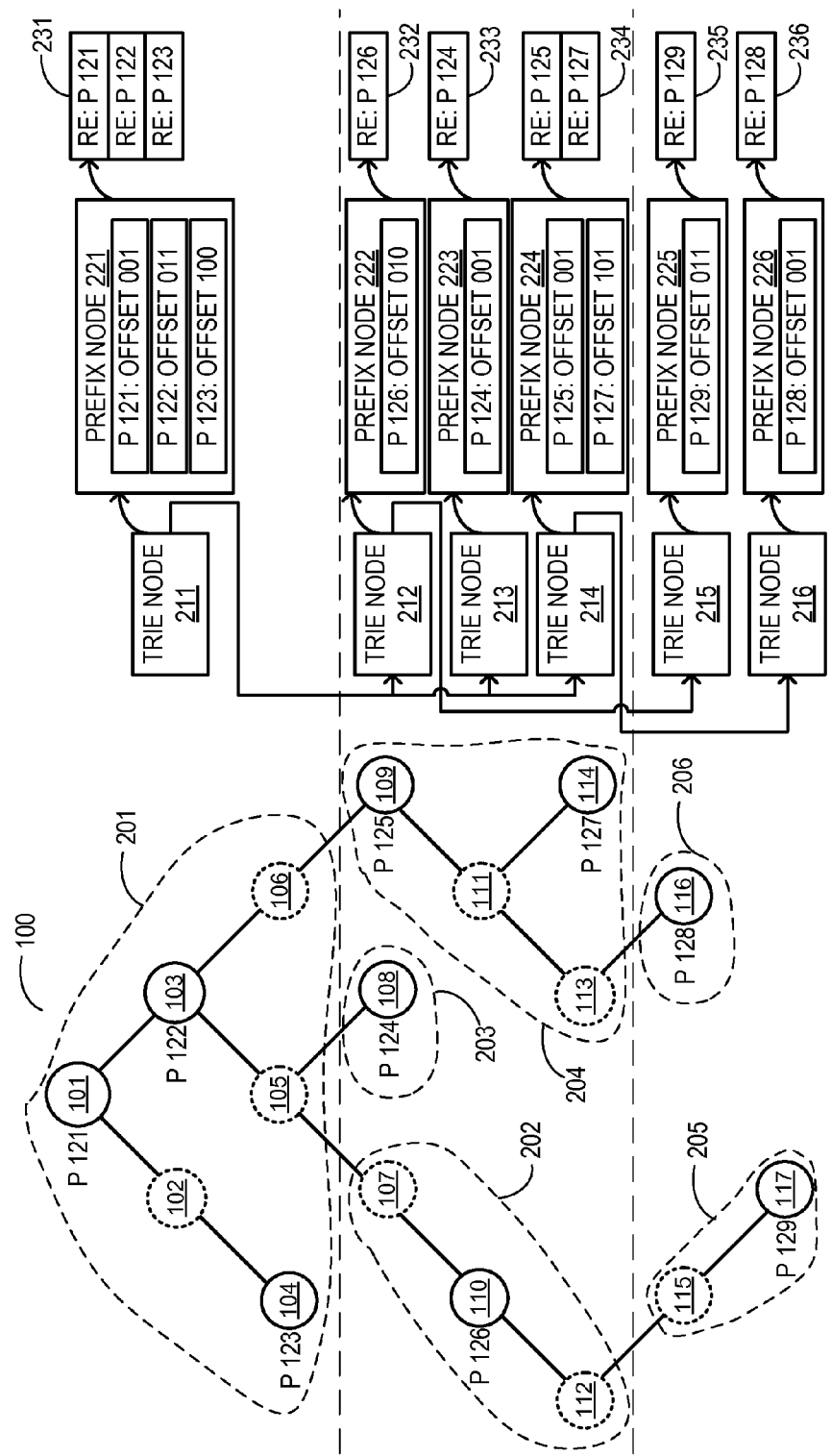
FIG. 2 illustrates an exemplary multi-bit trie-based representation of an FIB.

This lookup process can be further improved by multiple bits in the address being examined at a time. The number of bits examined at a time can be referred to as the stride size. The trie representing the prefixes is then divided into subtries, each subtrie representing a tree traversal of stride size. The trie can be referred as a multi-bit trie. FIG. 2 illustrates an exemplary multi-bit trie-based representation of an FIB. The multi-bit trie in FIG. 2 is the same trie as in FIG. 1; hence, the same numerals are used to represent the trie (trie 100). In this example, we consider a stride size of 3. Trie 100 is divided into subtries 201-206 based on the prefixes per stride size. For a stride size of 3, all prefixes with fewer than 3 bits (prefixes 121, 122, and 123) are represented by subtrie 201. Subtrie 202 is a child subtrie of subtrie 201, indicating that the first two bits (i.e., bits prior to the stride size) of all prefixes represented by subtrie 202 represents a path traversal through subtrie 201. For example, the first two bits of prefix 126 ("1000") corresponds to a path from node 101 to node 105 via node 103 of subtrie 201. Similarly, subtries 203 and 204 are child subtries of subtrie 201, subtrie 205 is a child subtrie of subtrie 202, and subtrie 206 is a child subtrie of subtrie 204. Note that the child subtrie relationship is transitive. For example, because subtrie 205 is a child subtrie of subtrie 202 and subtrie 202 is a child subtrie of subtrie 201, subtrie 205 is also a child subtrie of subtrie 201.

A respective subtrie is characterized by the prefixes associated with the subtrie, and one or more child subtries. Consequently, the subtrie can be represented by using the following data structures:

Trie node: one per subtrie to identify child subtries of the subtrie. In FIG. 2, trie nodes 211-216 represent subtries 201-206, respectively. Trie node 211 points to trie nodes representing child subtries of subtrie 201 (i.e., child subtrie nodes 212, 213, and 214). In some embodiments, a trie node 211 maintains a bitmap corresponding to the child subtrie nodes.

Prefix node: one per subtrie to identify prefixes represented by the subtrie. In FIG. 2, prefix nodes 221-226 represent subtries 201-206, respectively, and are pointed to by trie nodes 211-216, respectively. In some embodiments, a prefix node 221 maintains a bitmap corresponding to a respective prefix represented by the subtrie.

Routing element array: one per subtrie. In FIG. 2, routing element arrays 231-236 represent subtries 201-206, respectively, and are pointed to by prefix nodes 221-226, respectively. In some embodiments, a prefix node 221 includes a pointer to array 231, wherein elements in array 231 contain forwarding information for prefixes identified by prefix node 221 (prefixes 121, 122, and 123). Forwarding information for a respective prefix can include a network address of a next hop network router and a corresponding outgoing interface.

The prefixes identified by a prefix node can be represented using offset encoding. For example, a respective subtrie in FIG. 2 can have up to 7 nodes. These nodes can be numbered according to their breadth-first order, and the resulting prefix encoding is called offset encoding. Prefix 121 is the first node of subtrie 201 and represented by a bitstring "001" corresponding to an offset encoding value of 1. Similarly, prefix 123 is the fourth node of subtrie 201 and represented by a bitstring "100" corresponding to an offset encoding value of 4. During operation, a network router receives a packet with an 8-bit network address "11100101." For the lookup process, trie 100 is traversed with a stride size of 3. For the first stride, prefix 122 is identified as the longest prefix match in subtrie 201 (represented by an offset-encoded bitstring of "011" in prefix node 221). Then, the first stride is used to identify the corresponding child subtrie 204. For the second stride, prefix 125 is identified as the longest prefix match in subtrie 204 (represented by an offset-encoded bitstring of "001" in prefix node 224). Then the second stride is used to identify the corresponding child subtrie 206. For the third stride, prefix 128 is identified as the longest prefix match in subtrie 206 (represented by an offset-encoded bitstring of "001" in prefix node 226). Since there are no further child subtries to traverse, prefix 128 is finally identified as the longest prefix match for the address. Once the longest prefix match is found, routing element array 236 is accessed using the corresponding pointer in prefix node 226, and forwarding information for the match is retrieved from the array.

Rich Prefix Node

For a sparse trie, having separate trie nodes and prefix nodes for individual subtries can lead to wastage of memory. To overcome this issue, prefixes of a subtrie and its child subtries can be merged together in a prefix node. A length and value pair can be used to encode these prefixes. For example, prefix 127 in FIG. 1 can be represented as (5, 11101000), wherein 5 represents the length of the prefix indicating that the first 5 bits of "11101000" is the prefix. However, this approach can also lead to wastage of memory space because short prefixes must be expanded into long prefixes. Embodiments of the present invention present a memory-efficient prefix node, referred to as a rich prefix node that corresponds to prefixes represented by a plurality of subtries.

Figure 3A:
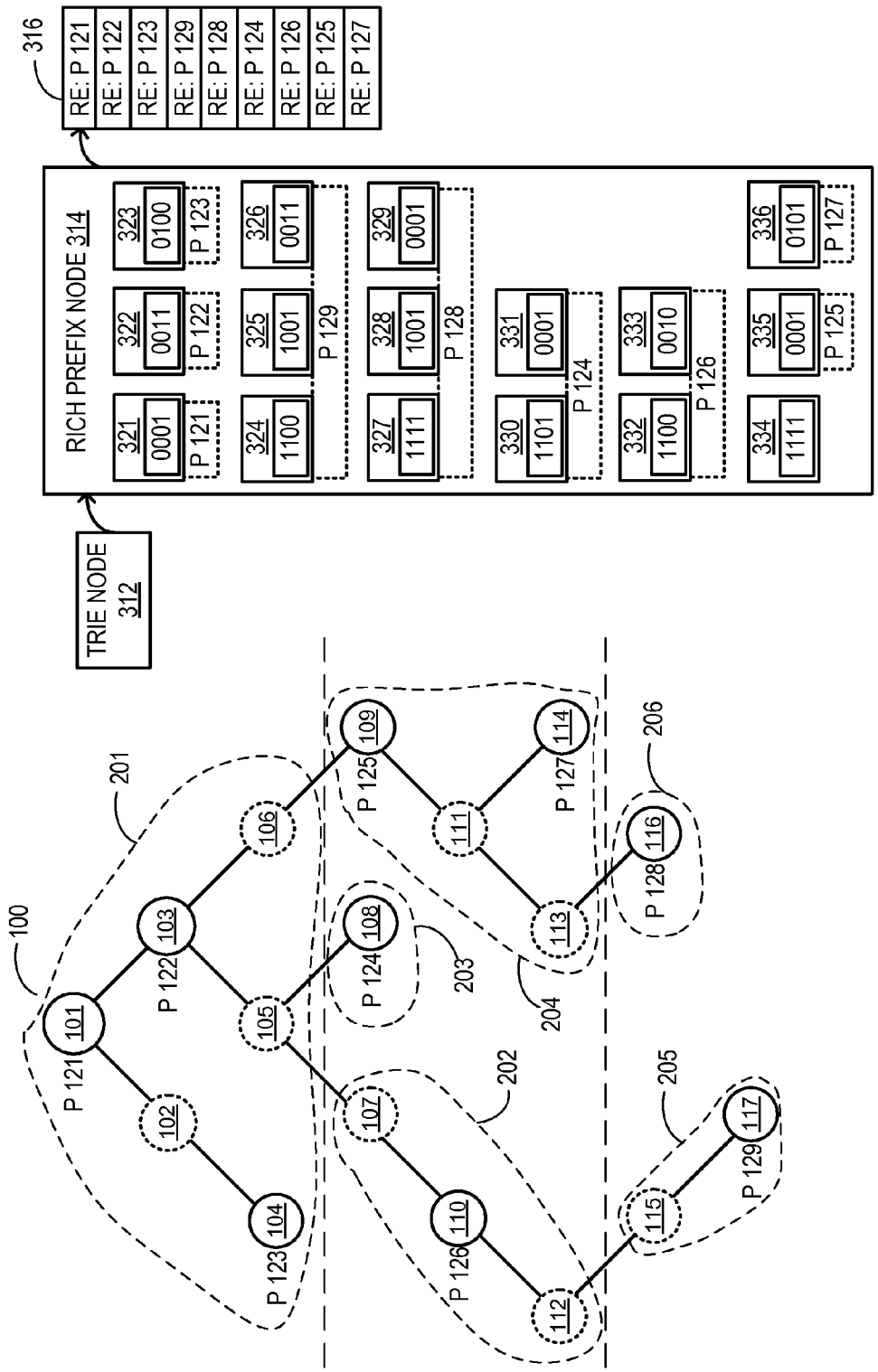
FIG. 3A illustrates an exemplary representation of a multi-bit trie using a rich prefix node, in accordance with an embodiment of the present invention.

FIG. 3A illustrates an exemplary representation of a multi-bit trie using a rich prefix node, in accordance with an embodiment of the present invention. The multi-bit trie in FIG. 3A is the same trie as in FIGS. 1 and 2; hence, the same numerals are used to represent the trie and its subtries. In this example, a trie node 312, a rich prefix node 314, and a routing element array 316 are used to fully encode trie 100. Using rich prefix node 314, only one trie node replaces six trie nodes in FIG. 2. Furthermore, rich prefix node 314 only stores one pointer to array 316. Representing trie 100 using rich prefix node 314, thus, achieves higher memory efficiency compared with the traditional multi-bit trie-based representation, as described in conjunction with FIG. 2.

Rich prefix node 314 includes fields 321-336. Rich prefix node 314 uses these fields to represent a reference to the subtrie to which a prefix belongs and a representation of a location within that subtrie that corresponds to the prefix. By incorporating both components that represent a prefix in trie 100, rich prefix node 314 includes prefixes belonging to subtries 201-206. For a stride size of 3, the size of a respective field can be 4 bits. In some embodiments, the MSB of a respective field is used as a flag that distinguishes the reference with the location. Remainder of the bits (e.g., 3 least significant bits (LSBs) in this example) of a field can be used as the corresponding value.

A set MSB (i.e., the bit is set to value "1") can indicate a tree-traversal path from root node 101 to the subtrie to which a prefix belongs. By tracing through the path, the prefix can be associated with the corresponding subtrie. When representing a path, one field represents traversal through one subtrie. Such consecutive fields indicate consecutive traversal through multiple subtries. For example, fields 324 and 325 have their MSBs set, indicating that each of them represents a tree traversal through a subtrie; their consecutive positioning indicates that together they represent a tree-traversal path for a prefix. On the other hand, a clear MSB (i.e., the bit is set to value "0") can indicate the position of a node representing the prefix using offset encoding in the subtrie. In some embodiments, the offset encoding is created in breadth-first order. For example, field 326 has its MSB clear, indicating that it represents a subtrie node corresponding to a prefix and its value indicates the offset-encoded location in a subtrie.

Combining the traversal path with the offset encoding allows a rich prefix node to specify any node in any subtrie. For example, prefix 129 of subtrie 205 can be represented using fields 324-326. Field 324 contains bits "1100," wherein the MSB of "1" indicates that field 324 is part of a tree-traversal path and the 3 LSBs of "100" identify the path from subtrie 201 to subtrie 202. Field 325 contains bits "1001," wherein the MSB of "1" indicates that field 325 is part of a tree-traversal path and the 3 LSBs of "001" identify the path from subtrie 202 to subtrie 205. Finally, field 326 contains bits "0011," wherein the MSB of "0" indicates that field 326 is an offset-encoded location of a node representing a prefix within subtrie 205, identified by its preceding tree-traversal path, and the 3 LSBs of "011" represent the offset encoding of node 117 in subtrie 205 representing prefix 129 of "1000011." Note that fields 324 and 325 are used to represent a tree-traversal path from root node 101 (i.e., subtrie 201) to subtrie 205, while field 326 is prefix 129's offset-encoded representation in subtrie 205. Similarly, prefixes 128, 124, and 126 can be represented using fields 327-329, 330-331, and 332-333, respectively.

Since prefixes 121, 122, and 123 are in subtrie 201, which contains root node 101, their offset encodings can be directly incorporated in rich prefix node 314 without any preceding tree-traversal path. For other prefixes in a child subtrie of subtrie 201, a tree-traversal path is used to identify a subtrie that represents a respective prefix, followed immediately by the position of a node representing the prefix using offset encoding in the subtrie.

When multiple prefixes are represented by a subtrie, such as subtrie 204, the nodes representing the prefixes can share a tree-traversal path. For example, because prefixes 125 and 127 belong to subtrie 204, these prefixes can be represented using fields 334-336. Field 334 contains bits "1111," wherein the MSB of "1" indicates that field 334 is part of a tree-traversal path and the 3 LSBs of "111" identify the path from subtrie 201 to subtrie 204. The path is shared by nodes representing prefixes 125 and 127. Field 335 contains bits "0001," wherein the MSB of "0" indicates that field 335 is an offset-encoded location of a node representing a prefix within subtrie 204, identified by its preceding tree-traversal path, and the 3 LSBs of "001" represent the offset encoding of node 109 in subtrie 204 representing prefix 125 of "111." Sharing the same path, field 336 contains bits "0101," wherein the MSB of "0" indicates that field 336 is another offset-encoded location of a node representing a prefix within the same subtrie 204, identified by its preceding tree-traversal path, and the 3 LSBs of "101" represent the offset encoding of node 114 in subtrie 204 representing prefix 127 of "11101." In some embodiments, trie node 312 can have child nodes. Under such a scenario, a respective child node can have its own rich prefix node, and the technique of identifying child subtrie nodes described in conjunction with FIG. 2 can be applied.

In some embodiments, the elements in array 316 are stored in the same order as the prefixes represented in rich prefix node 314. For example, prefix 129 is the fourth prefix encoded in rich prefix node 314. Hence, forwarding information for prefix 129 is stored in the fourth element of array 316. During operation, when the longest prefix match is found for a network address of a packet from the nth prefix in rich prefix node 314, forwarding information for the packet can be obtained by retrieving the nth array element from array 316. In some embodiments, the fields representing the prefixes are ordered in rich prefix node 314 in such a way that whenever a prefix match is found (except for the prefixes represented by the first trie), the match is the longest prefix match. For example, in rich prefix node 314, fields for prefix 129 are placed before fields for prefix 126, because prefix 126 itself is a prefix to prefix 129. As a result, if a match for prefix 129 is found, it is the longest prefix match. Alternatively, the fields representing the prefixes can be ordered based on the probability of finding a match. Fields representing a prefix with a high probability of finding a match are placed first in rich prefix node 314. Such orderings can improve the lookup process.

Figure 3B:
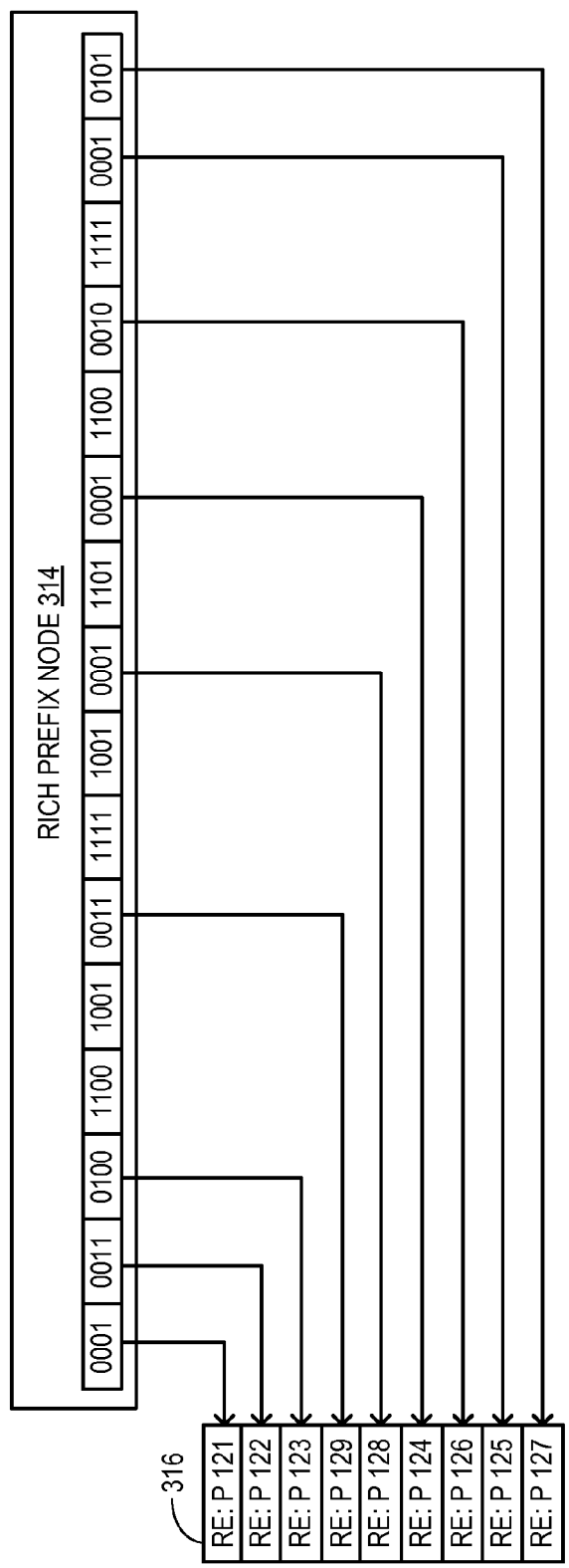
FIG. 3B illustrates an exemplary bit-level representation of a rich prefix node and a corresponding routing element array, in accordance with an embodiment of the present invention.

FIG. 3B illustrates an exemplary bit-level representation of a rich prefix node and a corresponding routing element array, in accordance with an embodiment of the present invention. The rich prefix node and the routing element array in FIG. 3B are the same rich prefix node and routing element array as in FIG. 3A; hence, the same numerals are used to represent the rich prefix node and the routing element array. Because all fields in rich prefix node 314 are of equal length (in FIGS. 3A and 3B, the length is 4), a respective field can be easily identified. In rich prefix node 314, if the MSB of a field is a "0," that field corresponds to a prefix. In other words, to represent 9 prefixes, rich prefix node 314 contains 9 fields with an MSB of "0." During the lookup process, whenever such a field is encountered, a counter value can be incremented, and when the longest prefix match is found, the corresponding counter value can be used to obtain the forwarding information from array 316. For example, the sixth field of rich prefix node 314 ("0011") is the fourth field with an MSB of "0." Hence, forwarding information for a longest prefix match for the prefix represented by the field can be found in the fourth element of array 316.

Multiple Rich Prefix Nodes

In some embodiments, the maximum size of a rich prefix node can be fixed due to memory bandwidth limitations or other design considerations. As a result, a trie node needs to support multiple rich prefix nodes when the aggregate size of representations of all prefixes exceeds the maximum node size. Under such a scenario, prefixes should be distributed among different rich prefix nodes.

In some embodiments, the distribution is based on pivot values. Under such a scenario, prefixes are first represented using their interval format (i.e., expressed as an interval using two full network addresses). For example, prefix 124 ("101*") in FIG. 1 can be expressed in interval format as "[10100000, 10111111]." One or more pivot values can be selected to divide prefixes evenly into groups, wherein one group of prefixes is represented by one rich prefix node. Alternatively, the distribution can be based on subtries, wherein a respective subtrie can be considered as part of a group represented by one rich prefix node. Under such a scenario, all prefixes within a subtrie must belong to the same rich prefix node.

Figure 4A:
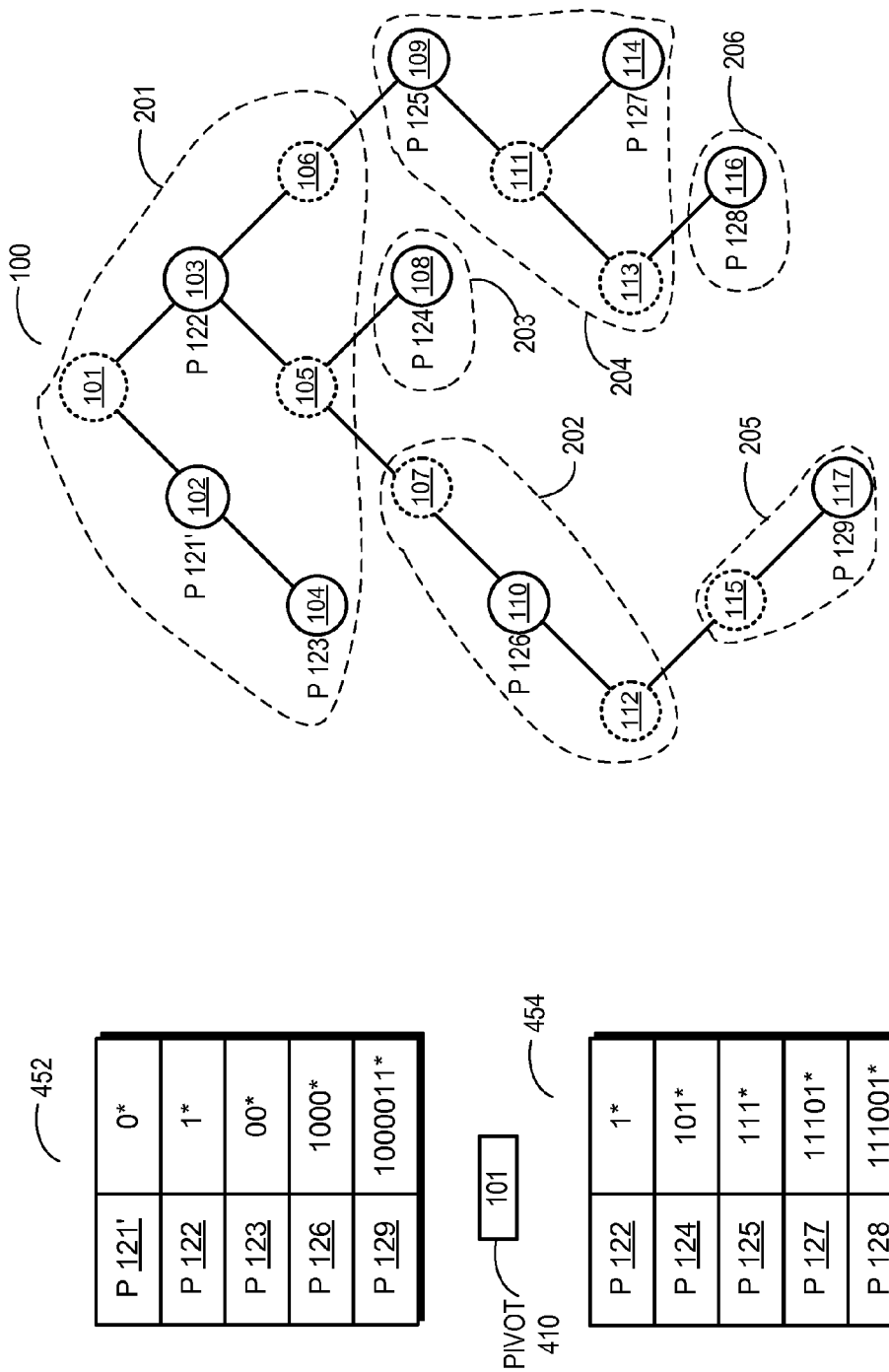
FIG. 4A illustrates an example of how network address prefixes are distributed based on a pivot value, in accordance with an embodiment of the present invention.

Pivot values can be selected using tree-traversal paths from the top-most subtrie to its immediate child subtries. FIG. 4A illustrates an example of how network address prefixes are distributed based on a pivot value, in accordance with an embodiment of the present invention. The same numerals are used to represent trie 100 and its subtries in FIG. 4A as well. In this example, prefix 124 ("101") can be used as a pivot value 410 to divide prefixes in FIG. 1 into two rich prefix nodes. As a result, all prefixes with a value less than "10100000" belong to a first group (shown in prefix table 452), while all prefixes with a value larger than or equal to "10100000" belong to a second group (shown in prefix table 454). However, prefixes falling into the interval representing the pivot should belong to both groups.

In some embodiments, to find the longest prefix match, only one rich prefix node is examined. In other words, a lookup operation of a specific network address is performed based on only one rich prefix node, and a respective rich prefix node should represent all relevant prefixes. Hence, prefixes 121 and 122 in subtrie 201 require special considerations because they themselves are prefixes to the pivot value. The simplest approach is to represent prefix 121 ("*") and prefix 122 ("1*"), in both the rich prefix nodes because "1" can be prefix to network address values both less and greater than the pivot value. On the other hand, this prefix duplication can be avoided for some cases as illustrated by prefix 121'. In this example, a combination of prefixes "0*" and "1*" can represent prefix "*," wherein prefix 121 can be converted to an equivalent prefix 121'="0*." Because "0" can be prefix to network address values only less than the pivot value, prefix 121' can be present in only one group. Note that, although prefix 121 is represented by node 101 in trie 100, prefix 121' is represented by node 102 in trie 100 based on the definition of the trie.

Figure 4B:
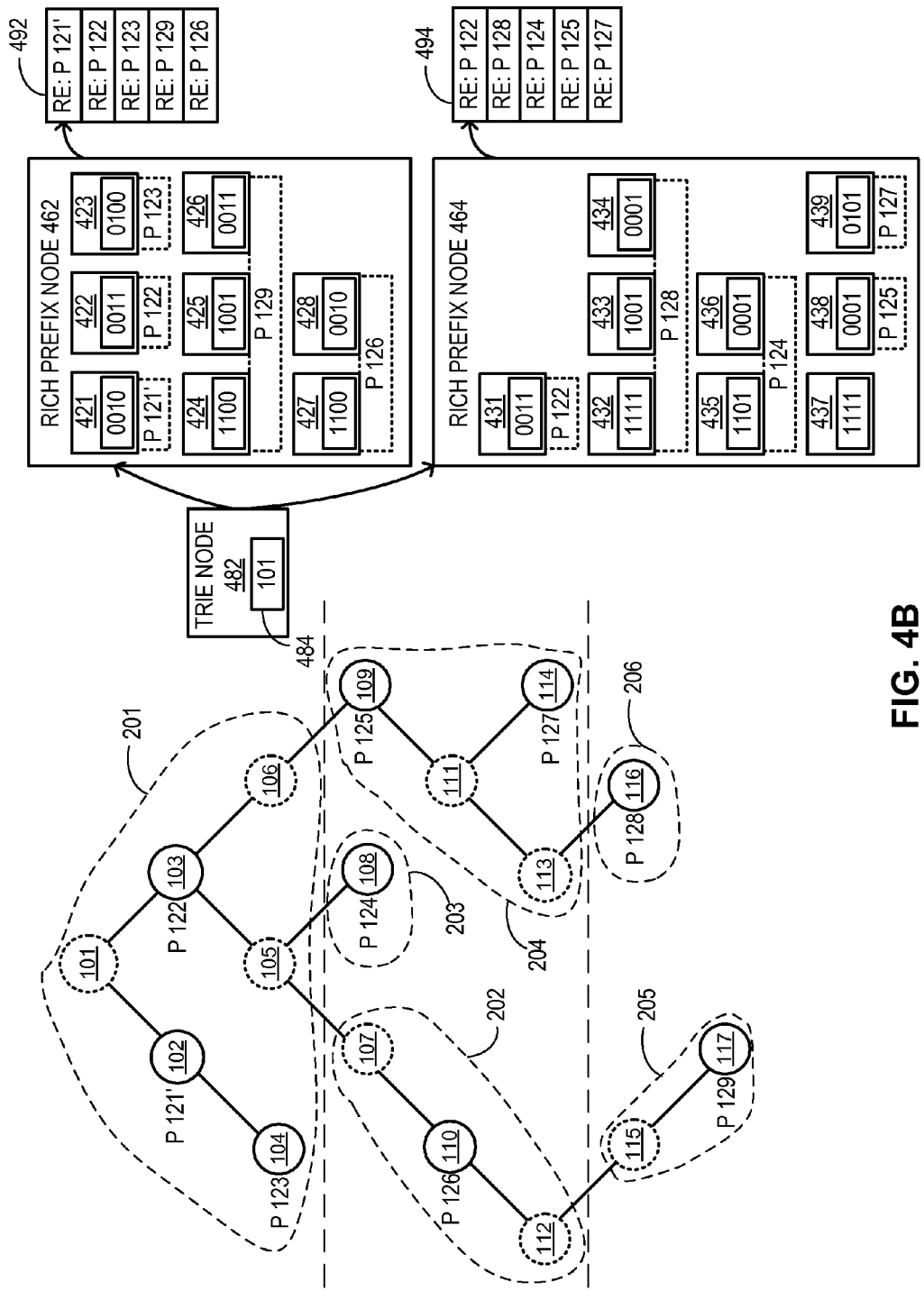
FIG. 4B illustrates an exemplary representation of a multi-bit trie using a plurality of rich prefix nodes, in accordance with an embodiment of the present invention.

FIG. 4B illustrates an exemplary representation of a multi-bit trie using a plurality of rich prefix nodes, in accordance with an embodiment of the present invention. In this example, trie node 482 contains a pivot value 484. Based on the pivot value, prefixes in groups 452 and 454 in FIG. 4A are represented by rich prefix nodes 462 and 464, respectively. These rich prefix nodes can have either shared or separate pointers from trie node 482. Prefixes 121', 122, 123, 129, and 126 are represented by rich prefix node 462 using fields 421, 422, 423, 424-426, and 427-428, respectively. Prefixes 122, 128, and 124 are represented by rich prefix node 464 using fields 431, 432-434, and 435-436, respectively. Prefix 125 is represented by fields 437 and 438, and prefix 127 is represented by fields 437 and 439 in prefix node 464. Routing element arrays 492 and 494 are associated with rich prefix nodes 462 and 464, respectively.

During operation, to look up network address "11101000," trie node 482 is obtained first, and the address is compared with the pivot's equivalent address of "10100000." Since the lookup address is larger, rich prefix node 464 is examined. The longest prefix match for the address is found to be prefix 127, which is the fifth prefix represented by rich prefix node 464. Hence, the fifth element from array 494 is retrieved to obtain corresponding forwarding information. Note that while only one pivot is shown in FIGS. 4A and 4B, the same scheme can be extended to multiple pivots for one trie node. In this way, one trie node can support a plurality of rich prefix nodes. In some embodiments, trie node 482 can have child nodes. Under such a scenario, a respective child node can have one or more rich prefix nodes, and the technique of identifying child subtrie nodes described in conjunction with FIG. 2 can be applied.

Lookup Process

Figure 5A:
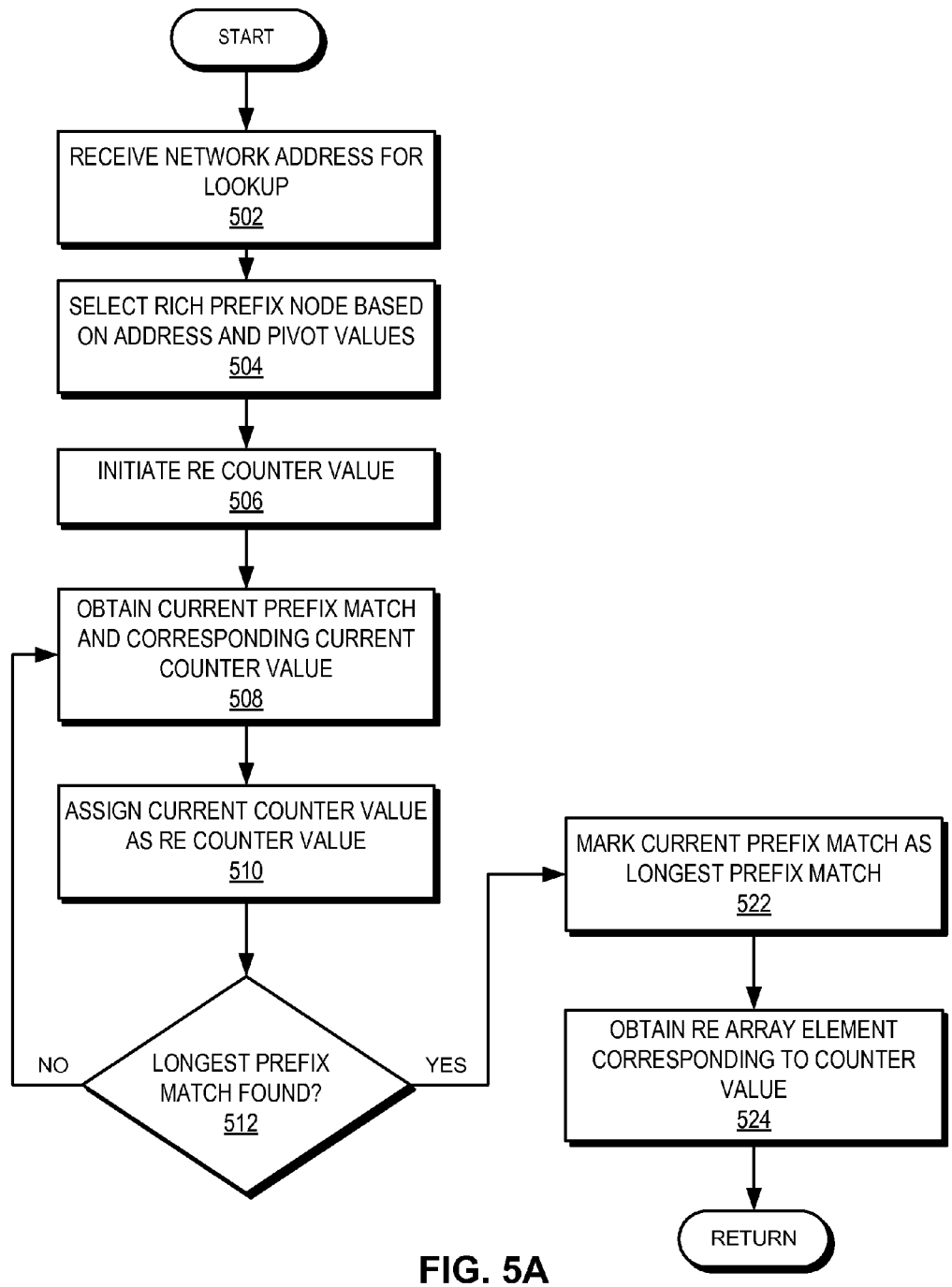
FIG. 5A presents a flowchart illustrating the process of a lookup engine finding a longest prefix match from a rich prefix node, in accordance with one embodiment of the present invention.

FIG. 5A presents a flowchart illustrating the process of a lookup engine finding a longest prefix match from a rich prefix node, in accordance with one embodiment of the present invention. Upon receiving a network address for lookup (operation 502), the lookup engine selects a rich prefix node for the lookup process based on the address, and one or more pivot values, as described in conjunction with FIG. 4B (operation 504). The lookup engine initiates a routing element counter value for identifying an element in a routing element array associated with the selected rich prefix node (operation 506), as described in conjunction with FIG. 3B. The lookup engine then obtains a prefix match and the corresponding counter value, referred to as the current counter value, from the rich prefix node (operation 508) and assigns the current counter value as the routing array element counter value (operation 510). Operation 508 is further elaborated upon in conjunction with FIG. 5B.

The lookup engine checks whether the prefix match is the longest prefix match (operation 512). In some embodiments, the longest prefix match is determined based on the ordering of the fields representing the prefixes in a rich prefix node. If the current match is not the longest prefix match, a longer prefix match and the current counter value from the rich prefix node are obtained (operation 508). Otherwise, the lookup engine marks the current prefix match as the longest prefix match (operation 522) and obtains the element corresponding to the counter value from the routing element array associated with the selected rich prefix node (operation 524).

Figure 5B:
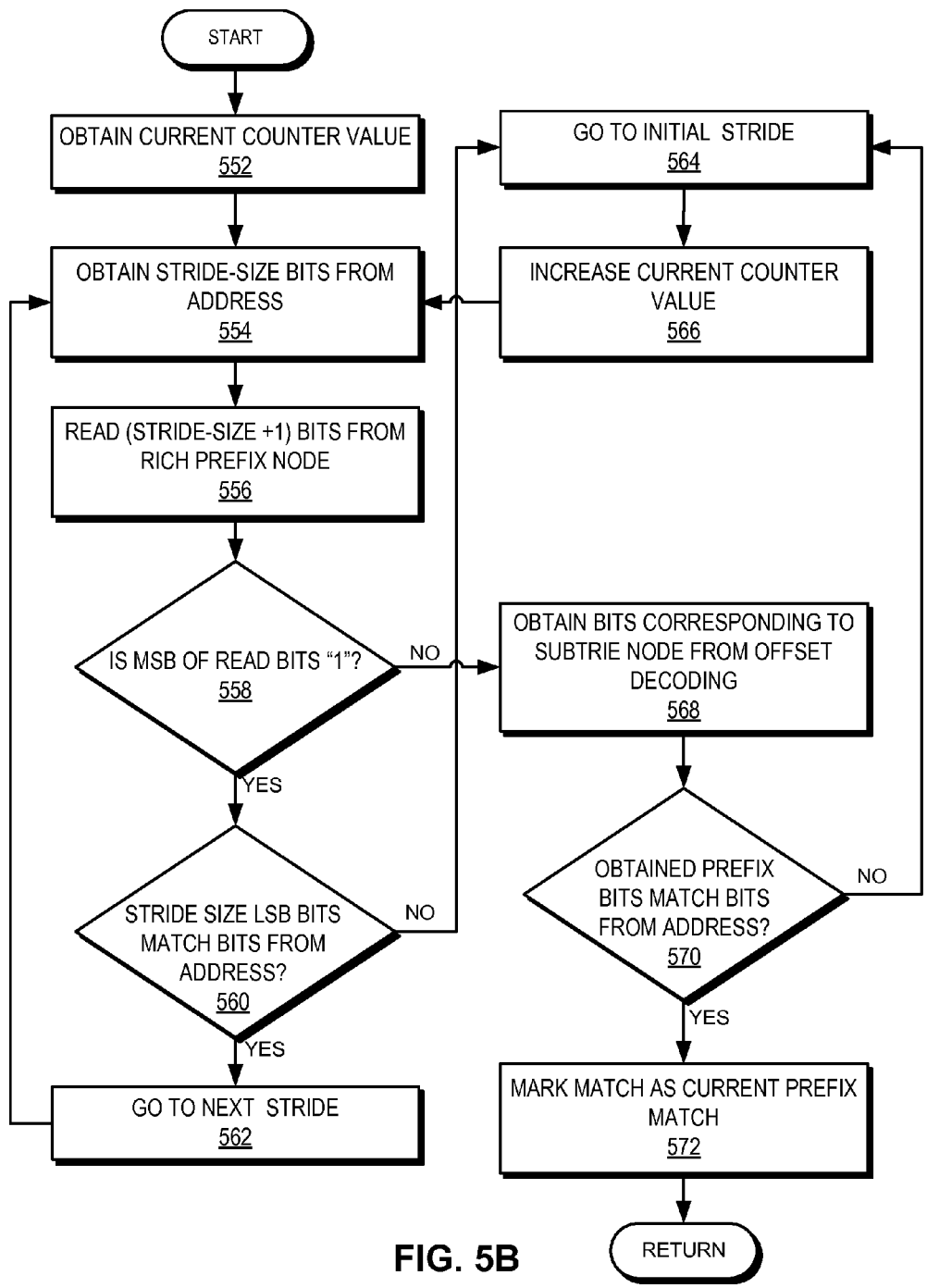
FIG. 5B presents a flowchart illustrating the process of a lookup engine finding a prefix match from a rich prefix node, in accordance with one embodiment of the present invention.

FIG. 5B presents a flowchart illustrating the process of a lookup engine finding a prefix match from a rich prefix node, in accordance with one embodiment of the present invention. The lookup engine first obtains a current counter value (operation 552). The current counter value can be obtained from a previously found prefix match, as described in conjunction with FIG. 5A. The lookup engine then obtains stride-size bits from the network address for which the lookup process is operational (operation 554). In the example in FIG. 3A, the stride size is 3 and the lookup engine reads 3 bits from the network address. The lookup engine also reads (stride-size+1) bits from a rich prefix node selected for the lookup process (operation 556). In the example in FIG. 3A, the lookup engine reads 4 bits from the rich prefix node. The lookup engine checks whether the MSB of the read bits is "1" (operation 558). If so, the following LSB stride-size bits represent a tree-traversal path, and the lookup engine checks whether the LSB stride-size bits match bits obtained from the network address (operation 560).

If the bits match, the lookup engine goes to the next stride (operation 562) and obtains next stride-size bits from the address (operation 554). This process continues until a match is found. If the MSB of the read bits is "0," the following LSB stride-size bits represent an offset-encoded representation of a node position in a subtrie, and the lookup engine obtains prefix bits corresponding to the offset encoding (operation 568). The lookup engine then checks whether the obtained prefix bits match the bits from the address (operation 570). The obtained prefix bits can be smaller in length than the bits from the address. Under such a scenario, the matching operation can be done by comparing an equal number of MSB bits of the bits from the address to the obtained prefix bits. If a match is found, the lookup engine marks the match as the current prefix match (operation 572). If a match is not found or the LSB stride-size bits from the rich prefix node do not match bits obtained from the network address, the lookup engine goes to the initial stride (operation 564). Note that going to the initial stride size refers to starting the lookup process from the first stride. The lookup engine then increases the current counter value (operation 566) and obtains stride-size bits from the address (operation 554).

Compact Prefix Node

A rich prefix node aggregates prefixes in one node in a memory-efficient way, applying offset encoding to prefixes within a subtrie. However, to represent the prefixes, offset encoding requires at least stride-size bits per prefix. Furthermore, because the maximum size of a rich prefix node can be fixed due to hardware implementations, offset encoding sets an upper limit on the number of prefixes in a rich prefix node. Hence, it is advantageous to have a more efficient encoding scheme for subtries with more prefixes (i.e., densely populated subtries). A compact prefix node can represent more prefixes in an efficient way. Note that the compact prefix node is for representing nodes in a subtrie. The compact prefix node can be used in conjunction with a rich prefix node, as described in conjunction with FIG. 3A, wherein a specific subtrie is identified for a prefix based on tree-traversal path through a trie.

Figure 6:
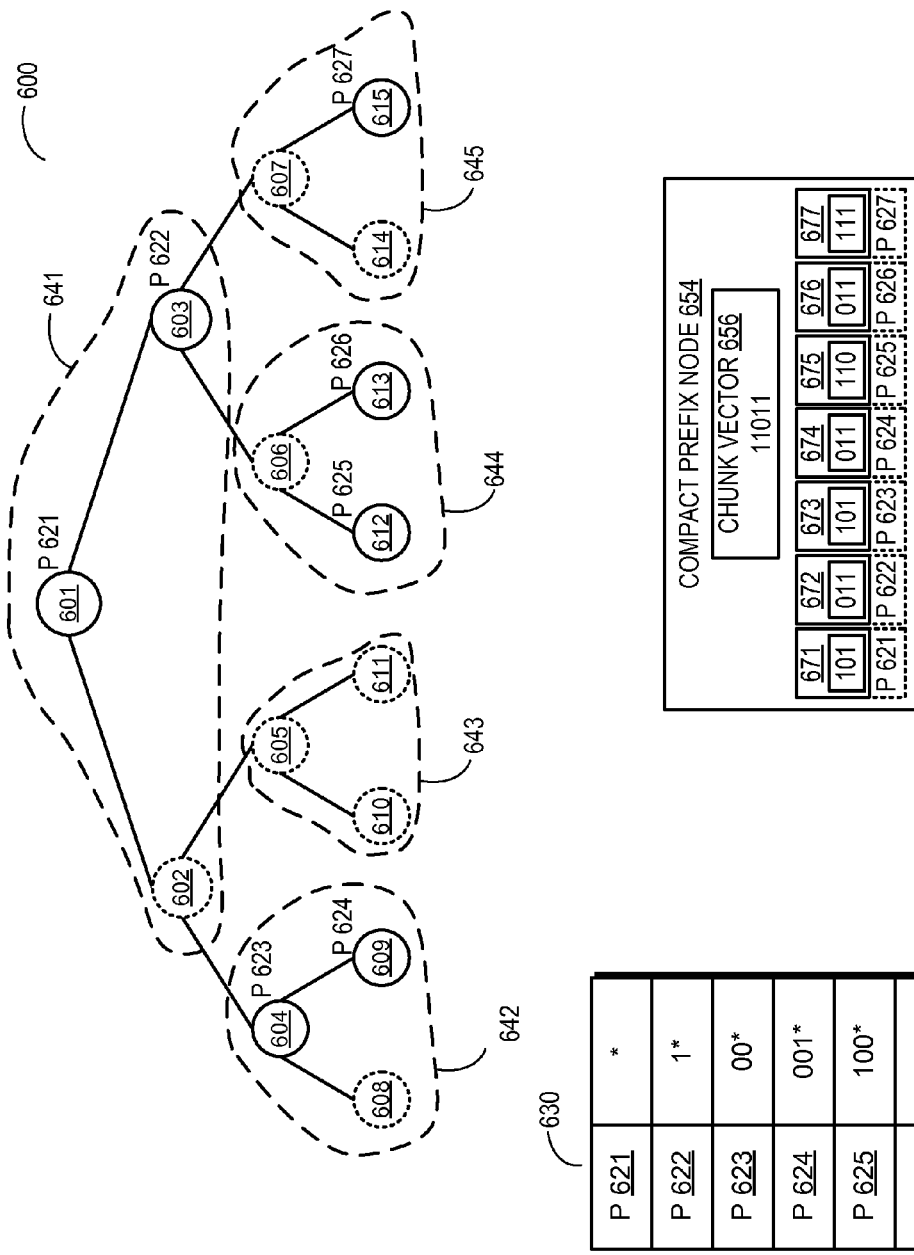
FIG. 6 illustrates an exemplary compact prefix node representing a subtrie in a multi-bit trie, in accordance with an embodiment of the present invention.

FIG. 6 illustrates an exemplary compact prefix node representing a subtrie in a multi-bit trie, in accordance with an embodiment of the present invention. Because a compact prefix node typically represents one subtrie, in this example, we show one subtrie 600 which can be a subtrie of a larger trie. Here, we show the principle of optimized compact nodes using a stride size of 4. Because lengths of prefixes 621-627 in prefix table 630 are less than 4, they are represented in one subtrie, namely subtrie 600.

Subtrie 600 has nodes 601-615 and is divided into chunks 641-645 (denoted using dashed lines) with 3 nodes per chunk. A respective chunk may or may not represent a prefix. In some embodiments, chunks are ordered in breadth-first order. For example, chunk 641 is the first chunk, chunk 642 is the second chunk, and so on. A chunk vector 656 in compact prefix node 654 is used to encode whether a respective chunk represents a prefix. The length of chunk vector 656 should be at least equal to the number of chunks. A set bit in chunk vector 656 indicates that the corresponding chunk represents at least one prefix. Since chunk 643 does not represent any prefix, chunk vector 656 is 11011.

Compact prefix node 654 contains several equal-length fields 671-677, wherein a respective field represents a respective prefix. For example, compact prefix node 654 has 7 such fields for the 7 prefixes represented by subtrie 600. A respective field contains the number of bits required to represent a node in a chunk using offset encoding, and one additional bit as a flag. For example, 2 bits are required to represent the 3 nodes in a respective chunk. Hence, a respective prefix represented by a node in a chunk can be encoded using 3 bits. The MSB of a field can be a flag bit indicating the start of a new chunk. The 2 LSB bits are offset encoding of a node within the chunk.

For example, prefix 621 is encoded in field 671 as "101," wherein the MSB of "1" indicates that prefix 621 is represented by a "new" chunk. Because the first bit of chunk vector 656 is "1," chunk 641 is identified as the corresponding chunk. The LSBs of "01" (i.e., the value 1) indicate that the node corresponding to prefix 621 is the first node within chunk 641. On the other hand, prefix 622 is encoded in field 672 as "011," wherein the MSB of 0 indicates that prefix 622 is represented by the same chunk as the preceding chunk (i.e., chunk 641). The LSBs of "11" (i.e., the value 3) indicate that the node corresponding to prefix 622 is the third node within chunk 641.

Because of the breadth-first ordering, the first two bits of chunk vector 656 are for fields 671-672 and 673-674, respectively. Then, field 675 encodes prefix 625 as "110," wherein the MSB of "1" indicates that prefix 625 is represented by a "new" chunk. However, the third and fourth bits in chunk vector 656 are "0" and "1," respectively, indicating that chunk 643 does not represent any prefix but chunk 644 does. Hence, chunk 644 is identified as the corresponding chunk for field 675. The LSBs of "10" (i.e., the value 2) indicate that the node corresponding to prefix 625 is the second node within chunk 644.

Figure 7A:
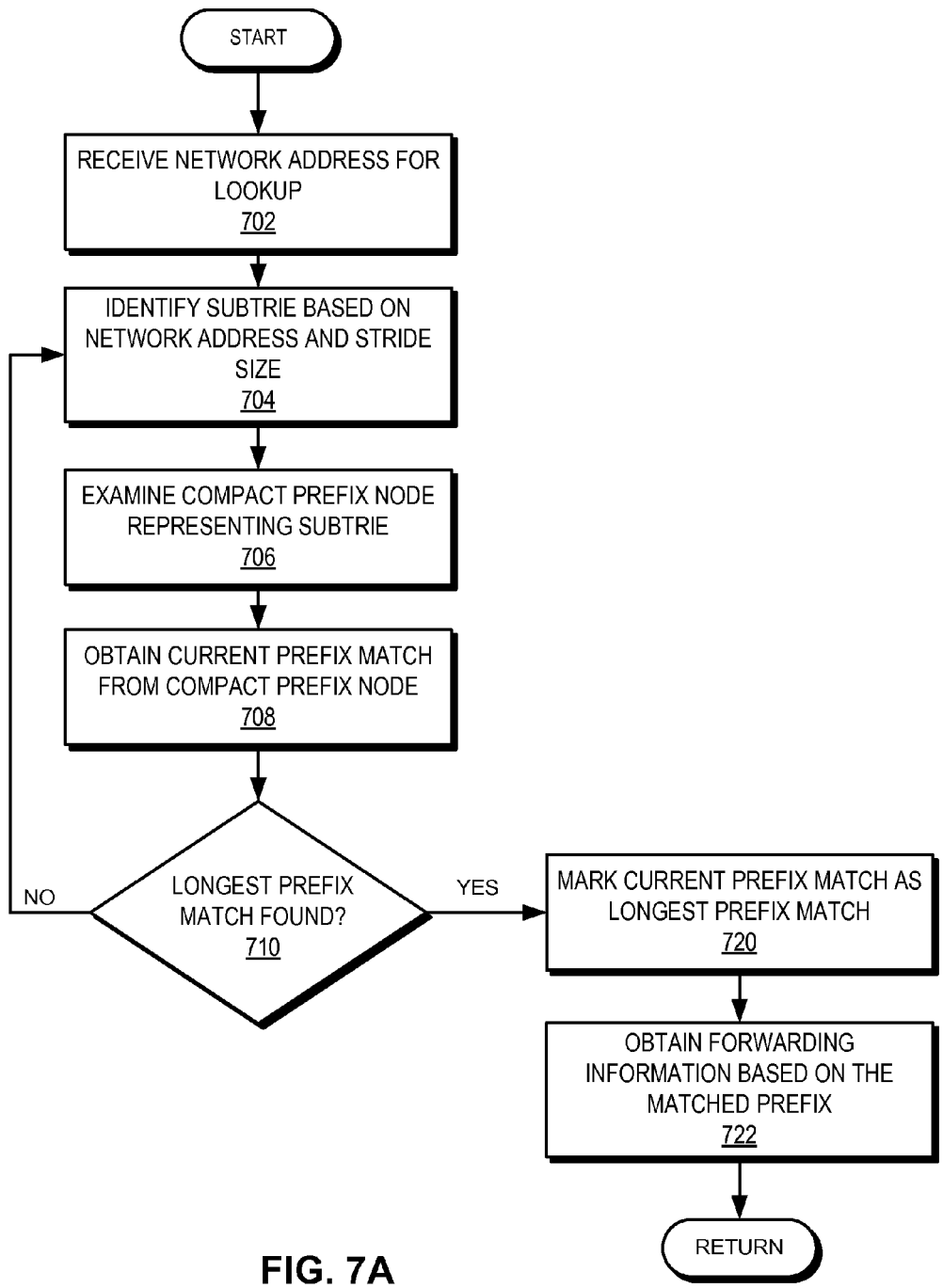
FIG. 7A presents a flowchart illustrating the process of a lookup engine finding a longest prefix match from a compact prefix node, in accordance with one embodiment of the present invention.

FIG. 7A presents a flowchart illustrating the process of a lookup engine finding a longest prefix match from a compact prefix node, in accordance with one embodiment of the present invention. Upon receiving a network address for lookup (operation 702), the lookup engine identifies a subtrie corresponding to a prefix based on the network address and a stride size (operation 704). In some embodiments, the subtrie is identified for a prefix based on the tree-traversal path through a trie, as described in conjunction with FIG. 3A. The lookup engine then examines the compact prefix node representing the identified subtrie for a prefix match (operation 706). Operation 706 is further elaborated upon in conjunction with FIG. 7B.

The lookup engine obtains a current prefix match from the compact prefix node (operation 708) and checks whether the prefix match is the longest prefix match (operation 710). In some embodiments, the longest prefix match is determined based on the ordering of the subtries representing the prefixes. If the current match is not the longest prefix match, the lookup engine identifies another subtrie corresponding to a longer prefix based on the network address and the stride size (operation 704). Otherwise, the lookup engine marks the current prefix match as the longest prefix match (operation 720) and obtains forwarding information based on the matched prefix (operation 722). In some embodiments, the forwarding information is obtained from a routing element array, as described in conjunction with FIG. 5A.

Figure 7B:
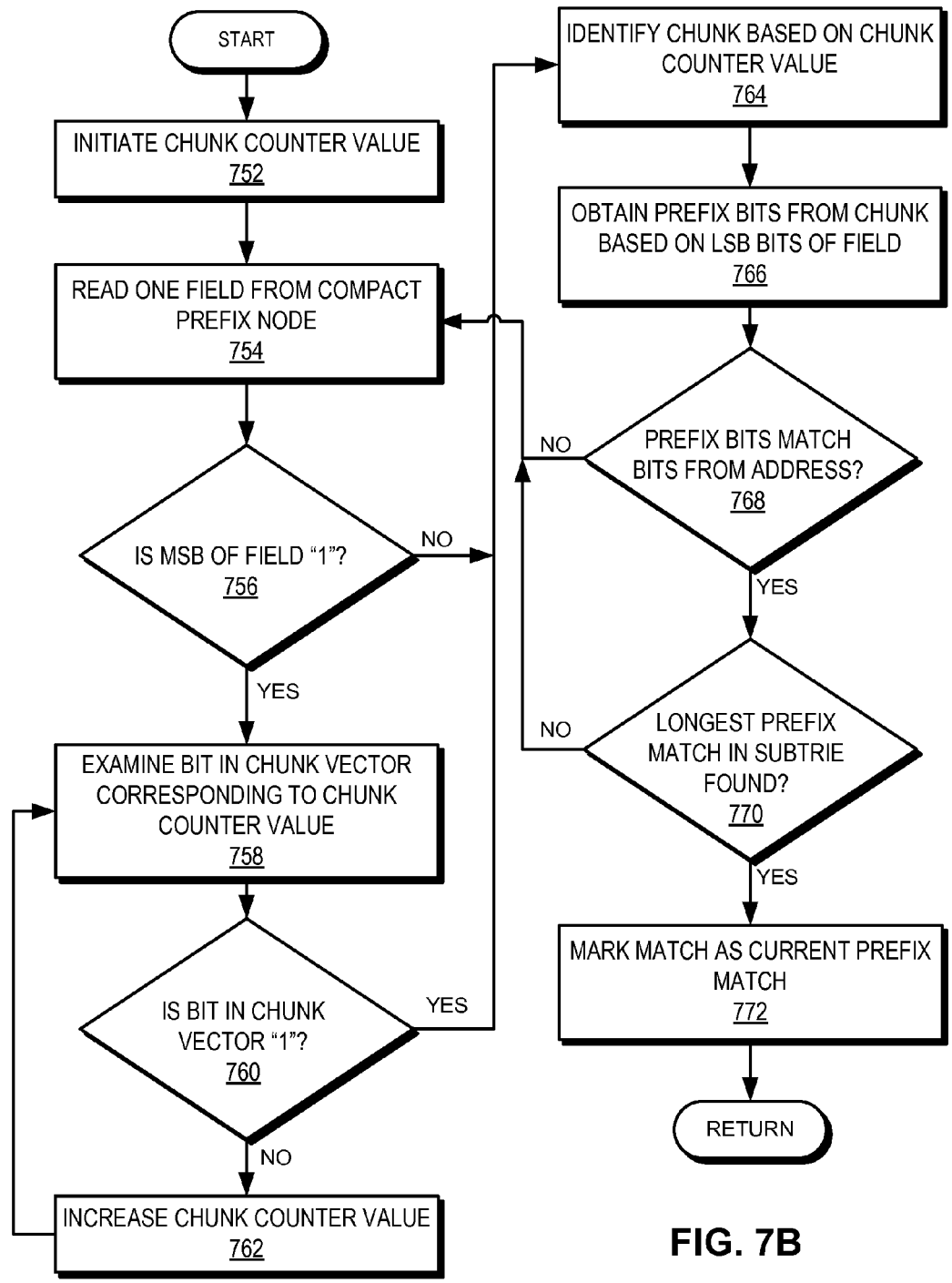
FIG. 7B presents a flowchart illustrating the process of a lookup engine finding a prefix match from a compact prefix node, in accordance with one embodiment of the present invention.

FIG. 7B presents a flowchart illustrating the process of a lookup engine finding a prefix match from a compact prefix node, in accordance with one embodiment of the present invention. The lookup engine first initiates a chunk counter value to parse a chunk vector in the compact prefix node (operation 752). The lookup engine then reads one field from the compact prefix node (operation 754) and checks whether the MSB of the field is "1" (operation 756). If so, the field corresponds to a new chunk. Hence, the lookup engine examines a bit from the chunk vector corresponding to the chunk counter value (operation 758) and checks whether the bit is "1" (operation 760). If the bit is not "1," the lookup engine increases the chunk counter value (operation 762) and examines the next bit from the chunk vector corresponding to the chunk counter value (operation 758).

If the MSB of the field is not "1" (operation 756) or the bit from the chunk vector is "1" (operation 760), the lookup engine identifies a chunk based on the chunk counter value (operation 764) and obtains prefix bits based on the LSB bits of the field (operation 766). The lookup engine then checks whether the obtained prefix bits match bits from the address (operation 768). The obtained prefix bits can be smaller in length than the bits from the address. Under such a scenario, the matching operation can be done by comparing an equal number of MSB bits of the bits from the address to the obtained prefix bits. If the bits match, then the lookup engine checks whether the longest prefix match for the subtrie is found (operation 770). In some embodiments, the ordering of fields in a compact prefix node indicates the longest prefix match in a subtrie. If the longest prefix match in the subtrie is found, the match is marked as the current prefix match (operation 772). On the other hand, if the obtained prefix bits don't match bits from the address (operation 768) or the longest prefix match in the subtrie is not found (operation 770), the lookup engine reads the next field from the compact prefix node (operation 754).

Exemplary System

Figure 8:
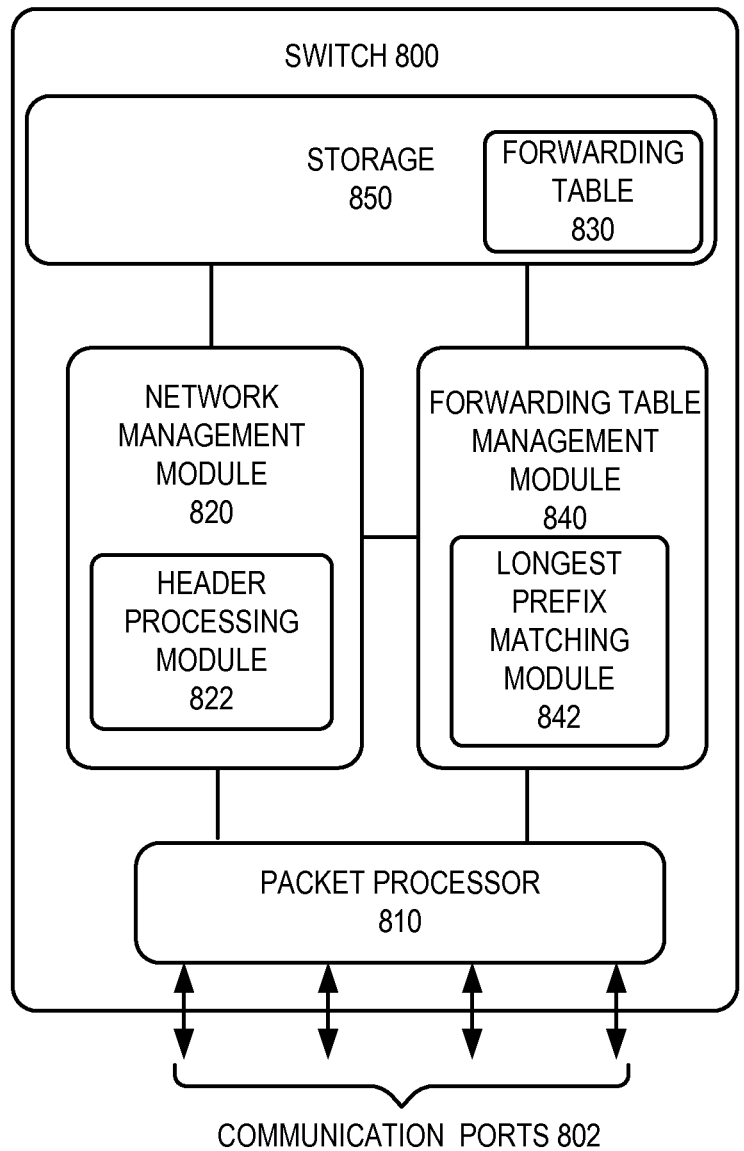
FIG. 8 illustrates an exemplary switching system, in accordance with one embodiment of the present invention.

FIG. 8 illustrates an exemplary switching system, in accordance with one embodiment of the present invention. In this example, router 800 includes a number of communication ports 802, which can transmit and receive data frames. Also included in system 800 are a packet processor 810, a network management module 820, a forwarding table management module 840, and a storage 850. Network management module 820 further includes a header processing module 822, and forwarding table management module 840 further includes a longest prefix matching module 842 (also referred to as a lookup engine). Storage 850 includes a forwarding table 830 (also referred to as an FIB), wherein forwarding table management module 840 stores network address prefixes.

During operation, packet processor 810 receives a packet from one of the communication ports 802. Header processing module 822 inspects the packet header and extracts the destination network addresses of the packet. Network management module 820 forwards the destination address to forwarding table management module 840. Longest prefix matching module 842 compares the address with prefixes stored in forwarding table 830 and finds the longest prefix match for the address. Based on the match, longest prefix matching module 842 obtains the corresponding forwarding information which can include an outgoing port for the packet among communication ports 802. Forwarding table management module 840 provides the forwarding information to network management module 820, which in conjunction with packet processor 810, transmits the packet via the outgoing port.

In summary, embodiments of the present invention provide a router. In one embodiment, the router includes a storage, a forwarding table management mechanism, and a longest prefix matching mechanism. The storage stores, in a data structure corresponding to a prefix node associated with a trie, a plurality of network address prefixes represented by the trie.

The forwarding table management mechanism expresses a respective network address prefix using one or more of: 1) a traversal path on the trie from a root node to a subtrie of the trie; and 2) an encoded representation of a node in the subtrie. The longest prefix matching mechanism matches a network address with a longest prefix from the network address prefixes stored in the data structure corresponding to the prefix node. In another embodiment, the storage stores, in a data structure corresponding to a prefix node associated with a trie, a plurality of network address prefixes represented by the trie. The forwarding table management mechanism expresses a respective network address prefix using one or more of: 1) a traversal path on the trie from a root node to a subtrie of the trie; and 2) an encoded representation of a node in the subtrie. The longest prefix matching mechanism matches a network address with a longest prefix from the network address prefixes stored in the data structure corresponding to the prefix node.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A router, comprising:
   a storage storing, in a data structure corresponding to a prefix node associated with a trie, a plurality of network address prefixes represented by the trie;
   a forwarding table management mechanism configured to express a respective network address prefix using:
      a traversal path on the trie from a root node to a subtrie of the trie; and
      an encoded representation of a node in the subtrie, wherein the encoded representation is based on offset encoding indicating a location of the node in the subtrie; and
   a longest prefix matching mechanism configured to match a network address with a longest prefix from the network address prefixes stored in the data structure corresponding to the prefix node.

2. The router of claim 1, wherein the traversal path to the subtrie corresponds to encoded representations of a plurality of nodes in the subtrie.

3. The router of claim 1, wherein the prefix node is associated with a plurality of subtries of the trie.

4. The router of claim 1, wherein the forwarding table management mechanism is further configured to distribute the network address prefixes to a plurality of rich prefix nodes based on one or more pivot values, wherein a respective pivot value identifies a range of network address prefixes to be associated with a corresponding rich prefix node.

5. The router of claim 4, wherein distributing a respective network address prefix to a corresponding rich prefix node comprises:
   determining the network address prefix to be greater than or smaller than the pivot value;
   in response to the network address prefix being greater than the pivot value, associating the network address prefix to a first rich prefix node; and
   in response to the network address prefix being smaller than the pivot value, associating the network address prefix to a second rich prefix node.

6. The router of claim 4, wherein the longest prefix matching mechanism is further configured to identify a respective rich prefix node for the network address using the pivot value.

7. The router of claim 1, wherein a plurality of prefix nodes are associated with a trie node, wherein the trie node represents one or more network address prefixes.

8. The router of claim 1, wherein the storage further stores a pointer to an array associated with the prefix node; and
   wherein a respective element in the array corresponds to a respective network address prefix in the prefix node and contains forwarding information associated with the network address prefix.

9. The router of claim 8, wherein elements in the array are ordered in the same way as the network address prefixes are ordered in the prefix node.

10. A router, comprising:
    a storage storing, in a data structure corresponding to a prefix node associated with a trie, a plurality of network address prefixes represented by a subtrie of the trie;
    a forwarding table management mechanism configured to express the network address prefixes using:
       a chunk vector indicating a presence of a network address prefix in a chunk of the subtrie, wherein the chunk represents a sub-tree of the subtrie; and
       an encoded representation of a node in the chunk; and
    a longest prefix matching mechanism configured to match a network address with a longest prefix from the network address prefixes stored in the data structure corresponding to the prefix node.

11. The router of claim 10, wherein the encoded representation is based on:
    a bit indicating whether the node is in the same chunk as a preceding node; and
    an offset encoding indicating a location of the node in the chunk.

12. The router of claim 10, wherein the storage further stores a pointer to an array associated with the prefix node; and
    wherein a respective element in the array corresponds to a respective network address prefix in the prefix node and contains forwarding information associated with the network address prefix.

13. A method, comprising:
    storing, in a data structure corresponding to a prefix node associated with a trie, a plurality of network address prefixes represented by the trie;
    expressing a respective network address prefix using:
       a traversal path on the trie from a root node to a subtrie of the trie; and an encoded representation of a node in the subtrie wherein the encoded representation is based on offset encoding indicating a location of the node in the subtrie; and matching a network address with a longest prefix from the network address prefixes stored in the data structure corresponding to the prefix node.

14. The method of claim 13, wherein the traversal path to the subtrie corresponds to encoded representations of a plurality of nodes in the subtrie.

15. The method of claim 13, wherein the prefix node is associated with a plurality of subtries of the tie.

16. The method of claim 13, further comprising distributing the network address prefixes to a plurality of rich prefix nodes based on one or more pivot values, wherein a respective pivot value identifies a range of network address prefixes to be associated with a corresponding rich prefix node.

17. The method of claim 16, wherein distributing a respective network address prefix to a corresponding rich prefix node comprises:

determining the network address prefix to be greater than or smaller than the pivot value;

in response to the network address prefix being greater than the pivot value, associating the network address prefix to a first rich prefix node; and in response to the network address prefix being smaller than the pivot value, associating the network address prefix to a second rich prefix node.

18. The method of claim 16, further comprising identifying a respective rich prefix node for the network address using the pivot value.

19. The method of claim 13, wherein a plurality of prefix nodes are associated with a trie node, wherein the trie node represents one or more network address prefixes.

20. The method of claim 13, further comprising storing a pointer to an array associated with the prefix node; and wherein a respective element in the array corresponds to a respective network address prefix in the prefix node and contains forwarding information associated with the network address prefix.

21. The method of claim 20, wherein elements in the array are ordered in the same way as the network address prefixes are ordered in the prefix node.

22. A method, comprising:

storing, in a data structure corresponding to a prefix node associated with a trie, a plurality of network address prefixes represented by a subtrie of the trie;

expressing the network address prefixes using:

a chunk vector indicating a presence of a network address prefix in a chunk of the subtrie, wherein the chunk represents a sub-tree of the subtrie; and an encoded representation of a node in the chunk; and matching a network address with a longest prefix from the network address prefixes stored in the data structure corresponding to the prefix node.

23. The method of claim 22, wherein the encoded representation is based on:

a bit indicating whether the node is in the same chunk as a preceding node; and an offset encoding indicating a location of the node in the chunk.

24. The method of claim 22, further comprising storing a pointer to an array associated with the prefix node; and wherein a respective element in the array corresponds to a respective network address prefix in the prefix node and contains forwarding information associated with the network address prefix.

* * * * *